United States Patent [19]

Maassen

[11] Patent Number: 4,553,832
[45] Date of Patent: Nov. 19, 1985

[54] TRI-COLOR ADDITIVE COLOR PRINTING HEAD AND ENLARGER

[75] Inventor: Egbertus J. P. Maassen, Eindhoven, Netherlands

[73] Assignee: U.S. Philips Corporation, New York, N.Y.

[21] Appl. No.: 606,017

[22] Filed: May 2, 1984

[30] Foreign Application Priority Data

May 9, 1983 [NL] Netherlands .................... 8301630

[51] Int. Cl.⁴ ................. G03B 27/32; G03B 27/52
[52] U.S. Cl. ............................... 355/32; 355/35; 355/71
[58] Field of Search .................. 355/35, 36, 32, 71

[56] References Cited

U.S. PATENT DOCUMENTS 2,780,155  2/1957  Debrie ........................... 355/32 X
3,684,371  8/1972  Weisglass et al. ............ 355/35 X Primary Examiner—Richard A. Wintercorn
Attorney, Agent, or Firm—Robert S. Smith

[57] ABSTRACT

A single light source illuminates an additive filter holder having three color filters of equal area arranged beside each other in a plane. Two filters are rectangular and lie within a rectangular whose diagonal defines a circle. The third filter has identical halves to opposite sides of the rectangular major sides within the circle. Color is adjusted by sliding screens over the filters.

4 Claims, 2 Drawing Figures

TRI-COLOR ADDITIVE COLOR PRINTING HEAD AND ENLARGER

BACKGROUND OF THE INVENTION

The invention relates to a device for adjusting the relative ratio of the colors red, green and blue in the light when making a print of a color film according to the additive method by means of a photographic enlarger and more particularly to such a device which comprises additive color filters which are transparent to red, green, and blue light, respectively, and which are situated during printing in a convergent light beam originating from the light source. Such a device is known from U.S. Pat. No. 3,923,394.

As used herein, a color film is a picture of a scene recorded on a film, and may be either a negative or a positive (a color slide) image as well. During printing, the color film is arranged at an area in the enlarger, for example, between the objective and an illumination system present in the enlarger.

The aforementioned U.S. Patent discloses an enlarging device comprising three light sources. Each light source is included in a respective elliptical reflector, and a color filter is arranged at the light-emanating side of each reflector. According to that Patent, such filters can be constructed as additive primary filters (red, green and blue). When printing according to the additive method, the spectral composition of the light incident upon the color film can be varied arbitrarily, for example by means of the supply current from the light sources, which are, for example, in the form of halogen incandescent lamps. According to the principle described, prints of high quality can be obtained.

A disadvantage of this additive enlarger is that the housing of the device in which the three light sources with the associated reflectors are present is voluminous. Moreover, the housing accommodates a mixing chamber which is also necessarily comparatively voluminous due to the use of three light sources. By means of such a mixing chamber, the light transmitted by the filters is mixed so that the light incident upon the color film is of homogeneous color. The use of three light sources further has the disadvantage that each light source has coupled to it a separate control unit for controlling the operating time and/or the light intensity.

SUMMARY OF THE INVENTION

An object of invention is to provide a compact device for adjusting the relative ratio of the red, green and blue colors in the light when printing color film according to the additive method. A further object is to provide an additive color enlarger or enlarger head having only one light source and control unit.

According to the invention, the filters of an enlarger color head are located in one plane and are received by a circular opening in a plate-shaped holder, the surface areas of the filters for each color being substantially equal to each other. Each filter can be adjustably screened entirely or in part from the light originating from the light source.

The device according to the invention has small dimensions. It is further sufficient to use only one light source. An additional supply with electric control unit, which is present in the known devices comprising a plurality of light sources, is avoided in the device according to the invention. The device is comparatively advantageous and can be manufactured in a simple manner.

In the device according to the invention, the spectral composition of the light incident upon a color film is controlled by the user adjustably covering, entirely or in part, a given filter of a given color. This is effected, for example, by moving a movable metal plate arranged in front of a filter. Such a plate is provided, for example, with a slide mechanism connected to a disk on which a scale division is arranged.

The filters are located in one flat plane and are received by a circular opening in a plate-shaped holder. This holder is so arranged with respect to the light source that at the area of the circular opening the light intensity is homogeneous in the convergent light beam.

In an embodiment of the device, the filters are present in the opening as three equal segments of a circle, which can be covered entirely or in part by three screening plates of the same shape. Preferably, however, the filters are located in the openings in such a manner that two filters are situated beside each other as rectangular halves of a rectangle in the circular opening, the diagonal of this rectangle substantially coinciding with the diameter of the circular opening and having the same length as this diameter, while the third filter is present in two halves located symmetrically on either side of the major sides of the rectangle. The advantage of this preferred embodiment is that there is a relationship between the quantity of transmitted light and the position of the screening plate with respect to the filter which can be measured in a simple manner.

The device according to the invention can be marketed as a separate unit or color head, which may be fitted to, for example, a known black-and-white enlarger. In one embodiment, the device is provided with a housing which accommodates the holder with filters and a mixing chamber and which can be detachably secured on the upper side of an enlarger by means of a snap coupling. However, the device may alternatively be marketed as an integrated part of an enlarger. Therefore, the invention also relates to such an enlarger. The aforementioned enlargers may comprise a condenser lens system.

An embodiment of the device according to the invention will be described more fully with reference to the drawing.

DESCRIPTION OF THE PREFERRED EMBODIMENT

Figure 1:
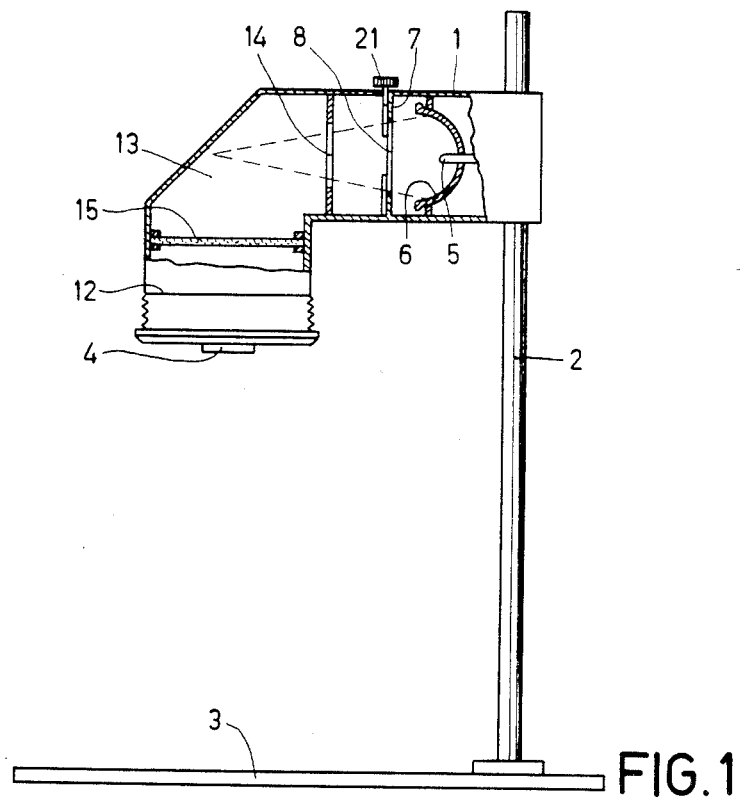
FIG. 1 shows diagrammatically, partly in elevational view and partly in sectional view, an enlarger provided with a device according to the invention.

The enlarger shown in FIG. 1, intended for making prints of color films, comprises a housing 1 which is slidably secured to a column 2. This column 2 is secured on a base 3 for a photosensitive paper onto which, during operation, the picture on the color film is projected by means of an objective 4 in the enlarger. The housing of the enlarger further accommodates a halogen incandescent lamp 5 in a reflector 6. At the light-emanating side of the reflector, a device with a plate-shaped holder 7 provided with a circular opening 8 is arranged, in which red, green and blue color filters (9, 10, 11a and 11b) are located in one plane (see FIG. 2). The surface areas of these filters per color are substantially equal to each other, filters 11a and 11b being of the same color. There are arranged between the objective 4 and the light source 5 a holder 12, in which, for example, a color negative or side can be arranged, and a mixing chamber 13 which is provided with an opening 14 and a diffuser 15 located near the exit opening of the mixing chamber. The reflector 6 is so shaped that in cooperation with the light source 5 a light beam is obtained whose point of convergence is located in the mixing chamber 13. At the area of the plane in the opening 8 in which the filters are located, the luminous intensity is homogeneous. The beam is indicated by a dotted line. With such a convergent beam, a sufficient mixing of the colors red, green and blue is obtained in the mixing chamber 13.

Figure 2:
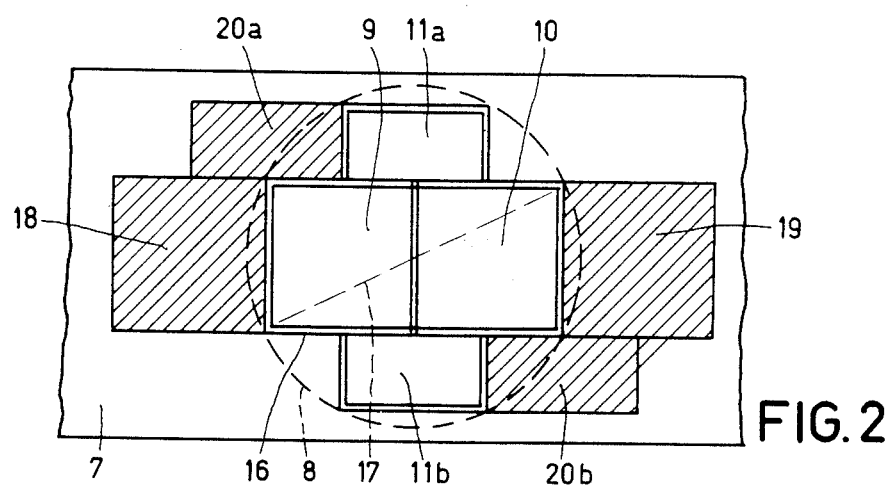
FIG. 2 is a plan view of a plate-shaped holder of the device provided with filters and screening plates which can be arbitrarily slipped in front of the filters.

FIG. 2 indicates the circumference of the circular opening 8 in the plate-shaped holder 7 by a dashed line. Two color filters, such as a red filter (9) and a green filter (10), are arranged beside each other in the opening on a rectangular chassis 16. The diagonal of the rectangle, which is constituted by the filters (9) and (10) located on the chassis, is coincident with and has the same length as a diameter of the circular opening indicated by a dotted line 17. The blue color filter is present in two parts (11a and 11b) of equal surface area, but whose sum is equal to the surface area of the filter 9 or of the filter 10. The parts are located symmetrically on either side of the remaining filters. It should be noted that in an alternative embodiment the red or the green filter may be composed of two halves instead of the blue filter.

In order to adjust the relative ratio of the color components red, green and blue in the light during printing, the holder is provided with screening plates, which can be slipped entirely or in part in front of the filters. These plates are designated by reference numerals 18, 19, 20a and 20b. The covering plates are connected through a coupling mechanism to control buttons, which are provided with a scale division (not shown in FIG. 2). For illustration, in FIG. 1 a single control button is designated by 21.

In a practical embodiment, the largest diameter of the reflector is 50 mm; the light source included in the reflector is a halogen incandescent lamp having a power of 75 W. The distance of the edge of the reflector from the plate-shaped metal holder is approximately 10 mm.

The opening in this holder is circular and has a diameter of 35 mm. At the area of the opening, four light-transmitting dichroic color filters, i.e. a red filter (18×18 mm), a green filter (18×18 mm) and two blue filters (each 18×9 mm) are arranged on the chassis 16. The opening of the mixing chamber is circular and has a diameter of 26 mm. The diffusor 15 has a diameter of 80 mm.

What is claimed is:

1. A device for adjusting the relative ratio of the colors red, green and blue in light used for making photographic color prints, comprising
    a light source providing a convergent beam,
    a filter holder disposed in said convergent beam, having an opening therethrough for transmitting light,
    additive color filters, respectively transparent to red, green and blue, disposed in a plane and received in said opening, the surface areas of each of said filters being substantially equal to each other; first and second of said filters being each rectangular in shape and being arranged beside each other so as to define a rectangle having major sides whose diagonal defines a circle; and said third filter being formed by two halves disposed symmetrically on either side of the major sides of the rectangle, within said circle, and
    a plurality of adjustable screens for screening light passing through respective ones of the filters.

2. A device as claimed in claim 1, characterized in that said adjustable screens are movable in a direction parallel to said rectangle major sides.

3. A photographic enlarger provided with a housing accommodating a source of light of adjustable color components, a mixing chamber, and an optical system for imaging a color picture using light from said mixing chamber, in which the source of light of adjustable color components is a device as claimed in claim 2.

4. A photographic enlarger provided with a housing accommodating a source of light of adjustable color components, a mixing chamber, and an optical system for imaging a color picture using light from said mixing chamber, in which the source of light of adjustable color components is a device as claimed in claim 1.

* * * * *